United States Patent
Williams et al.

(10) Patent No.: US 8,360,151 B2
(45) Date of Patent: Jan. 29, 2013

(54) METHODS FOR MITIGATION OF ANNULAR PRESSURE BUILDUP IN SUBTERRANEAN WELLS

(75) Inventors: Robert Williams, Houston, TX (US); Emmanuel Therond, Paris (FR); Laurent Delabroy, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 426 days.

(21) Appl. No.: 12/622,562

(22) Filed: Nov. 20, 2009

(65) Prior Publication Data

US 2011/0120716 A1 May 26, 2011

(51) Int. Cl.
*E21B 33/13* (2006.01)
*E21B 33/14* (2006.01)
*C09K 8/88* (2006.01)
*C09K 8/94* (2006.01)

(52) U.S. Cl. ........ 166/295; 166/285; 166/294; 166/300; 166/309; 507/202; 507/225; 507/267; 507/269; 507/903

(58) Field of Classification Search ............... 166/285, 166/394, 295, 300, 309; 507/202, 224, 225, 507/267, 277, 903
See application file for complete search history.

(56) References Cited

U.S. PATENT DOCUMENTS

| | | | |
|---|---|---|---|
| 2,832,414 A | 4/1958 | Battle | |
| 4,683,949 A | 8/1987 | Sydansk et al. | |
| 4,724,906 A | 2/1988 | Sydansk | |
| 5,246,073 A | 9/1993 | Sandiford et al. | |
| 5,335,733 A | 8/1994 | Sandiford et al. | |
| 5,486,312 A | 1/1996 | Sandiford et al. | |
| 5,617,920 A | 4/1997 | Dovan et al. | |
| 5,947,644 A | 9/1999 | Gibbons et al. | |
| 6,450,260 B1 | 9/2002 | James et al. | |
| 6,715,553 B2 | 4/2004 | Reddy et al. | |
| 7,156,175 B2 | 1/2007 | Reddy et al. | |
| 7,441,599 B2 | 10/2008 | Hermes et al. | |
| 7,566,686 B2 | 7/2009 | Kipple et al. | |
| 7,963,333 B2 * | 6/2011 | Hermes et al. | 166/300 |
| 8,100,179 B2 * | 1/2012 | Hermes et al. | 166/288 |
| 2003/0010503 A1 | 1/2003 | Staudt | |
| 2007/0114033 A1 | 5/2007 | Hermes et al. | |
| 2009/0133878 A1 | 5/2009 | Hermes et al. | |

FOREIGN PATENT DOCUMENTS

| | | |
|---|---|---|
| WO | WO2004/079240 | 9/2004 |
| WO | WO2005/085586 | 9/2005 |
| WO | 2006/117517 | 11/2006 |

(Continued)

OTHER PUBLICATIONS

Bloys, B. et al.: "Trapped Annular Pressure Mitigation: A Spacer Fluid that Shrinks—Update," paper SPE 112872 (2008).

(Continued)

*Primary Examiner* — George Suchfield
(74) *Attorney, Agent, or Firm* — Matthias Abrell

(57) ABSTRACT

Compositions and methods that mitigate pressure buildup in the annular space between two tubular bodies in subterranean wells. The composition of the invention comprises an aqueous solution of crosslinkable acrylamide-base polymer, a crosslinker and a gas. Once foamed and placed in the annular space, the composition provides a resilient, flexible, compressible and durable body that is able to compensate for pressure increases in the annular space, thereby protecting the integrity of the tubular bodies.

25 Claims, 4 Drawing Sheets

FOREIGN PATENT DOCUMENTS

| WO | WO2006/114607 | 11/2006 |
| WO | WO 2006/120515 | 11/2006 |
| WO | WO2007/061816 | 5/2007 |
| WO | WO2009/105554 | 8/2009 |

OTHER PUBLICATIONS

Bloys, B. et al.: "Trapped Annular Pressure Mitigation: A Spacer Fluid that Shrinks," paper SPE 104698 (2007).

Hasan, A.R.: "Ensuring Sustained Production by Managing Annular-Pressure Buildup," paper SPE 121754 (2009).

Moe, B. and Erpelding, P.: "Annular Pressure Buildup: What Is It and What to Do About It," Deepwater Technology (Aug. 2000) 21-23.

Oudeman P. and Kerem, M.: "Transient Behavior of Annular Pressure Buildup in HP/HT Wells," J. Petroleum Technology (18) 3 (2005) 58-67.

Rozières J. and Griffin, T.J.: "Foamed Cement," in Nelson E.B. (ed.) Well Cementing, Elsevier, Amsterdam (1990) 14-1-14-19.

Sathuvalli, U.B. et al.: "Development of a Screening System to Identify Deepwater Wells at Risk for Annular Pressure Buildup," paper SPE 92594 (2005).

* cited by examiner

Sodium Lactate (vol%)

METHODS FOR MITIGATION OF ANNULAR PRESSURE BUILDUP IN SUBTERRANEAN WELLS

BACKGROUND OF THE INVENTION

The statements in this section merely provide background information related to the present disclosure and may not constitute prior art.

This invention relates to compositions and methods for treating subterranean formations, in particular, compositions and methods to mitigate annular pressure buildup in subterranean wells.

During the construction of a subterranean well, one or more tubular bodies, such as casings or liners, are installed to support the borehole and provide a conduit through which hydrocarbons or other formation fluids may flow to the surface for recovery. Usually, each pipe string extends to a greater depth than its predecessor, and has a smaller diameter than its predecessor. Primary cementing is usually performed after the installation of each pipe string. This involves placing cement slurry in the annular region between the exterior surface of the pipe string and the borehole wall, and allowing it to harden. The set cement is substantially impermeable, and bonds to the pipe and the borehole wall. Thus, the set cement supports the pipe string and provides hydraulic isolation. Hydraulic cements, usually Portland cement, are typically used to cement the tubular bodies within the wellbore. Remedial cementing operations may also be conducted, involving plugging highly permeable zones or fractures in wellbores, plugging cracks and holes in pipe strings, etc.

As mentioned above, multiple casing strings are usually concentric; thus, there are annular spaces between them. Normally, each annular volume between the casing strings is filled to some extent with fluid that was present in the wellbore when the casing was installed. The entire annulus between the casing strings is not usually cemented; however, in many cases, set cement does seal the bottom portion of each annulus.

Formation-fluid production from a well is initiated after the strings of tubulars have been installed and primary cementing operations have been completed. The formation fluids may include crude oil, natural gas liquids, petroleum vapors, synthesis gas (e.g., carbon monoxide), other gases (e.g., carbon dioxide), steam, water or aqueous solutions. The temperatures of formation fluids are usually higher than those further uphole. In such cases, as formation fluids travel toward the production facility, they heat the pipe strings and the surrounding wellbore. This will in turn raise the temperature of fluids inside the annuli between the pipe strings, and the fluids will tend to expand.

In many cases, such as wells on land, the fluid expansion may be relieved at the surface. However, in offshore-well situations in which the wellhead is submerged, both the top and bottom of each annulus may be sealed. A typical scenario is shown in a cross-sectional diagram (FIG. 1). A series of successive, concentric casing strings 1 has been installed in a subterranean wellbore. The cement sheath 2 covers the annular region between each casing string and the formation 3. Only the casing string with the widest diameter has been cemented to surface. The other strings are not cemented to surface—only the regions between those casings and the formation are covered by the cement sheath. This leaves annular regions 4 that are not completely cemented; instead, they are filled with other well-completion fluids such as drilling fluid, spacer fluid, chemical wash and completion brine. Further uphole, the annuli are sealed to prevent the fluids contained therein from leaking into the environment.

Under these circumstances, there is no outlet for annular-fluid expansion. When the formation fluids heat the fluid trapped in the annulus between the casing strings, the resulting expansion may pressurize the annulus to a level that would cause severe wellbore damage, including damage to the cement sheath, the casing, tubulars and other wellbore equipment. This process is known in the art as annular pressure buildup (APB). The industry has attempted to solve the APB problem in a variety of ways.

Foamed fluids have been used; however, operators have encountered difficulties placing them near high-permeability formations In addition, the foam may not be stable over the long term, leading to breakout of the gaseous phase and a reduction of the fluid's ability to compensate for pressure fluctuations.

Another fluid system contains a polymerizable monomer, for example methyl methacrylate (MMA). After placement in the annulus between two casings, the MMA is made to crosslink when annular temperature increases due to production of hot formation fluids. The resulting polymer is significantly more dense than the monomer; as a result, the fluid volume decreases, and the pressure inside the sealed annulus also decreases. The amount of monomer is chosen such that the pressure decrease in the annulus will be sufficient to mitigate the APB. The fluid may comprise a gas-generating agent. Liberation of gas inside the sealed annulus after fluid placement provides a compressible gas pocket. The fluid may also comprise a porous foam material such as polystyrene or polyurethane.

Syntactic foam is a wrapable or sprayable foam that is impregnated with cenospheres or glass microspheres. The foam typically covers the tubular body across the interval where APB is anticipated. The hollow spheres are designed to rupture at a predetermined pressure, creating more volume in the annulus. However, this approach is problematic for two reasons. First, the foam may break off during the tubular-body installation, creating obstructions in the annulus that may impede proper fluid placement. Second, the foam is not resilient—it works only once to reduce annular volume.

Fluids that contain hollow glass microspheres have been reported. The glass microspheres are available in several grades with failure ratings between about 4,000 and 10,000 psi. Operators choose grades that are most appropriate for the anticipated APB. This approach can be problematic when the microsphere-containing fluid is pumped around a casing shoe during a primary-cementing operation. The bottomhole pressure may exceed the collapse pressure of the glass spheres, and the resulting collapse of the spheres destroys the utility of the fluid. Situations may also occur in which an operator chooses a grade of microspheres that can survive the bottomhole pressure, but the anticipated APB further up the annulus is lower than the microsphere-failure rating. In such situations, the microspheres will not rupture when needed to control APB, potentially resulting in casing failure.

Several mechanical methods for controlling APB have been developed, including burst disks and hollow centralizer elements. Once ruptured, burst-disk assemblies may require well reentry for replacement. Such operations involve considerable downtime which can be very expensive in offshore environments. Hollow centralizer elements are sealed by valves or rupture disks. When APB occurs, the seals rupture and allow fluid influx into the hollow element to relieve the pressure. These centralizers provide a limited amount of volume mitigation, and the effects of fluid influx on the structural integrity of the centralizer is unclear.

It is therefore desirable to develop a system for controlling APB that overcomes the problems mentioned above.

SUMMARY OF THE INVENTION

The first aspect is a composition for controlling annular pressure buildup between two tubular bodies within a subterranean wellbore. The composition comprises an aqueous solution of crosslinkable acrylamide-base polymer, a crosslinker and a gas. Such gas-bearing fluids are known in the art as being "foamed" or "energized." Nitrogen is the preferred gas; however, other gases such as (but not limited to) air and carbon dioxide are also envisioned. The preferred amount of gas in the solution, or "quality," is between about 5% to about 50% by volume.

A copolymer of acrylamide and sodium acrylate is the preferred crosslinkable polymer and, henceforth, will be referred to by the acronym ASAC.

One embodiment of the first aspect comprises ASAC, a chromium (III) crosslinker, a gas and water. The crosslinker is preferably a water-soluble chromium (III) compound, most preferably chromium (III) acetate. The chromium (III) acetate concentration may vary from about 0.2% to about 1.2% by weight, preferably between about 0.3% to about 1.2% by weight.

Another embodiment of the first aspect comprises ASAC, a gas, water and a crosslinker comprising amine and phenyl compounds. The preferred amine compound is hexamethylenetriamine, preferably present at concentrations ranging from about 0.2% to 0.5% by weight. The preferred phenyl compound is phenyl acetate, preferably present at concentrations ranging from about 0.2% to 1.0% by weight. The fluid may further comprise an activator to control the working time, and may also comprise a high-temperature stabilizer. At fluid temperatures lower than about 52° C., the preferred activator is hydrochloric acid, preferably present in an amount up to about 0.5% by weight. At fluid temperatures higher than about 52° C., the preferred activator is acetic acid, preferably present at a concentration up to about 0.4% by weight. A stabilizer, preferably sodium bicarbonate, may be necessary at fluid temperatures above about 60° C.

Both of the above embodiments may also contain particulate additives. These additives may be added for a number of reasons: to adjust the fluid density, to increase the strength of the crosslinked gel and as an extender to reduce fluid cost. The particulate additives envisioned in the invention include (but are not limited to) amorphous or crystalline silica, hematite, barite, ilmenite, manganese tetraoxide, calcium carbonate, bentonite, attapulgite, smectite, montmorillonite, kaolinite, illite, chlorite, zeolites, diatomaceous earth, perlite, coal and gilsonite.

The second aspect is a method for controlling pressure buildup within an annular volume between two tubular bodies in a subterranean wellbore.

The method comprises the following steps: (1) preparing a volume of a composition described by the first aspect, the volume being sufficient to fill at least a portion of the annular volume; (2) transporting the composition to, and filling at least a portion of, the annular volume; (3) sealing the annular volume; (4) allowing the polymer of the composition to crosslink and form a gel; (5) heating the annular volume, thereby increasing the pressure inside the annular volume; and (6) allowing the composition described by the first aspect of the invention to compress and compensate for the pressure increase inside the annular volume.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
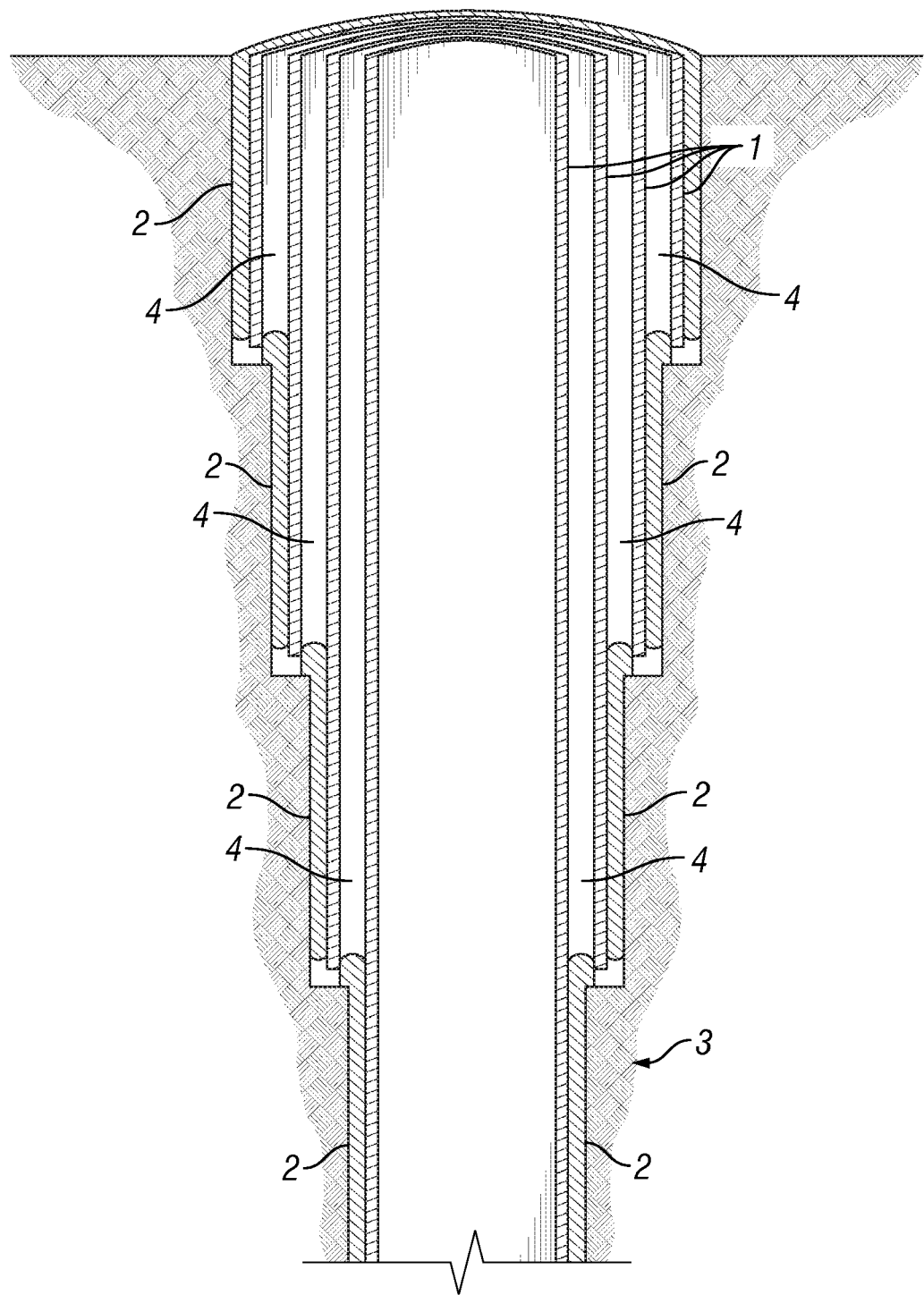
FIG. 1 is a diagram illustrating annular volumes between two tubular bodies in a subterranean well, in which annular pressure buildup may occur.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The first aspect is a composition for controlling annular pressure buildup between two tubular bodies within a subterranean wellbore. The composition comprises an aqueous solution of crosslinkable acrylamide-base polymer, a crosslinker and a gas. Such gas-bearing fluids are known in the art as being "foamed" or "energized." Nitrogen is the preferred gas; however, other gases such as (but not limited to) air and carbon dioxide are also envisioned. The preferred amount of gas in the solution, or "quality," is between about 5% to about 50% by volume. In this instance, quality is expressed in terms of the volume of gas that would be present in the solution at atmospheric pressure.

When the polymer crosslinks, the solution transforms into a durable and flexible gel that encapsulates the gaseous phase. The resulting composition is compressible, and is sufficiently strong to maintain gas entrainment during multiple pressurization/depressurization cycles. When present in a closed annulus as described earlier, the gas-entrained gel will compress in response to APB, relieving pressure that would otherwise be exerted against the tubular bodies.

ASAC is the preferred crosslinkable polymer. The polymer molecular weight is preferably between about 300,000 to 10,000,000, and most preferably between about 300,000 to 1,000,000. The preferred concentration range is between about 1% to 8% by weight, and most preferably between about 4% and 7% by weight.

Those skilled in the art will appreciate that other acrylamide-base polymers may be used. Examples include, but are not limited to, polymethacrylamides, polyacrylamides, acrylic acid-acrylamide copolymers, acrylic acid-methacrylamide copolymers, partially hydrolyzed polymethacylamides and partially hydrolyzed polyacrylamides.

One embodiment of the first aspect comprises ASAC, a chromium (III) crosslinker, a gas and water. The crosslinker is preferably a water soluble chromium (III) compound, most preferably chromium (III) acetate. The chromium (III) acetate concentration may vary from about 0.2% to about 1.2% by weight, preferably between about 0.3% to about 1.2% by weight. As shown in Table 1, the optimal ASAC/chromium (III) acetate ratio varies according to the anticipated service temperature. This is necessary to maximize gel stability.

TABLE 1

Optimal concentrations of ASAC and chromium (III) acetate at various fluid temperatures.

| Fluid Temperature (° C.) | ASAC (MW = 500K) (wt %) | Cr (III) Acetate (wt %) | ASAC/Cr (III) Acetate Ratio |
|---|---|---|---|
| <60 | 4 | 0.32 | 12.5/1 |
| 60-91 | 5 | 0.5 | 10/1 |
| 91-107 | 5 | 0.63 | 8/1 |
| 107-121 | 6-7 | 1.0-1.2 | 6/1 |

Figure 2:
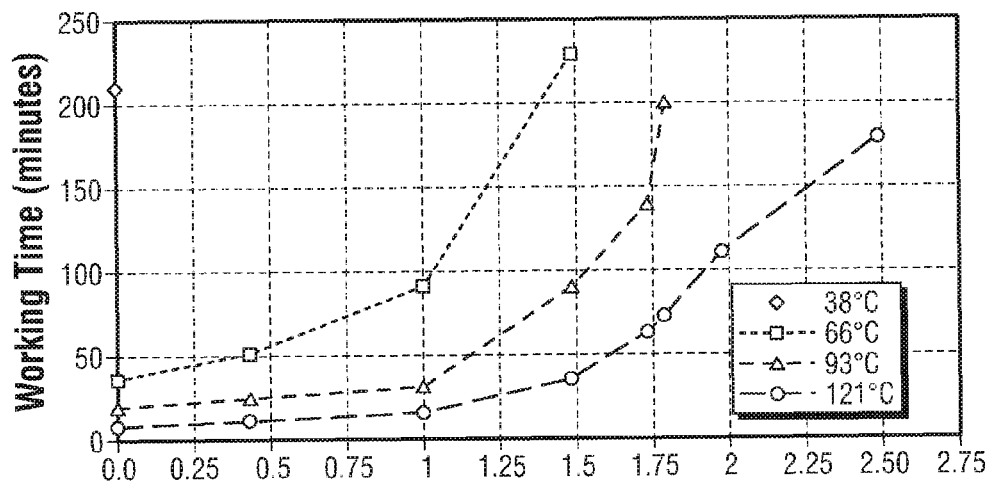
FIG. 2 is a plot showing the effect of sodium lactate on the working time of a fluid containing a crosslinkable acrylamide-base polymer.

The pumping time may be adjusted by adding a delay agent comprising one or more carboxylate species including (but not limited to) formate, acetate, proprionate, lactate, lower substituated derivatives thereof, and mixtures thereof. The preferred delay agent is sodium lactate, preferably added at concentrations ranging from about 0.2% to about 2.6% by weight. As shown in FIG. 2, addition of sodium lactate can significantly extend the working time of the solution when increasing temperature.

Figure 3:
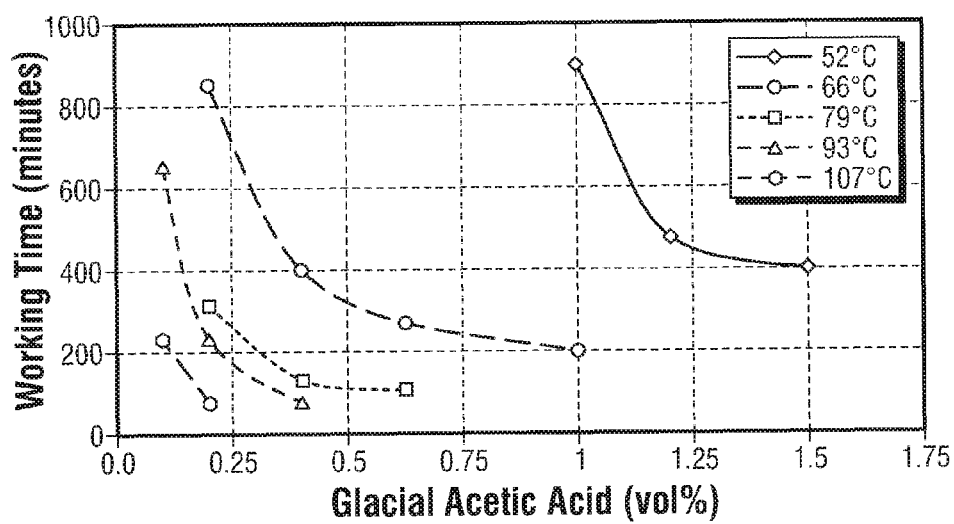
FIG. 3 is a plot showing the effect of glacial acetic acid on the working time of a fluid containing a crosslinkable acrylamide-base polymer.
Figure 4:
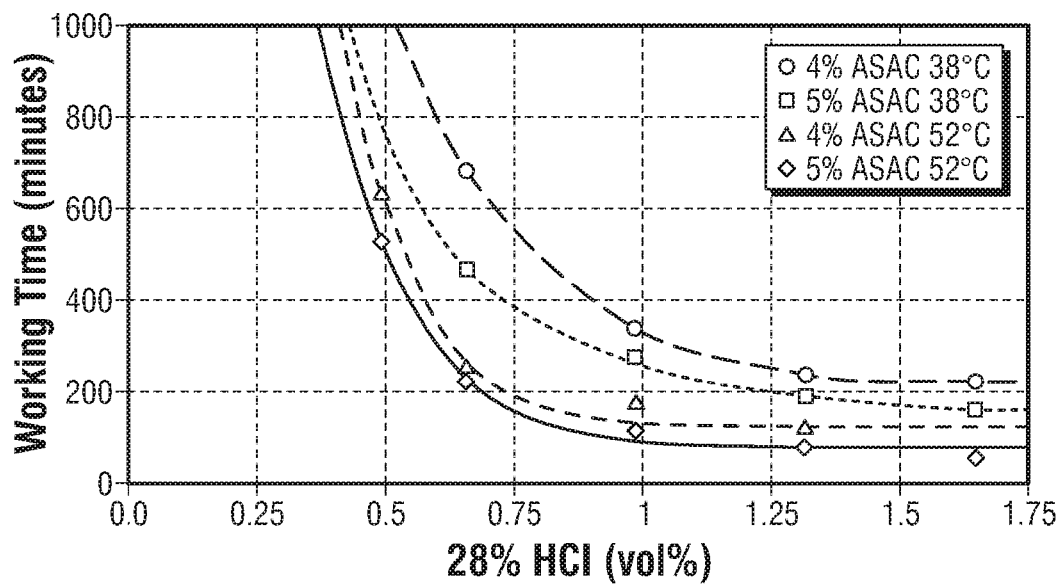
FIG. 4 is a plot showing the effect of 28% hydrochloric acid on the working time of a fluid containing a crosslinkable acrylamide-base polymer.

Another embodiment of the first aspect comprises ASAC, a gas, water and a crosslinker comprising amine and phenyl compounds. The preferred amine compound is hexamethylenetriamine, preferably present at concentrations ranging from about 0.2% to 0.5% by weight. The preferred phenyl compound is phenyl acetate, preferably present at concentrations ranging from about 0.2% to 1.0% by weight. The fluid may further comprise an activator to control the working time, and may also comprise a high-temperature stabilizer. At fluid temperatures lower than about 52° C., the preferred activator is hydrochloric acid, preferably present in an amount up to about 0.5% by weight. At fluid temperatures higher than about 52° C., the preferred activator is acetic acid, preferably present at a concentration up to about 0.4% by weight. A stabilizer, preferably sodium bicarbonate, may be necessary at fluid temperatures above about 60° C. Optimal base-fluid compositions and performance data are presented in Tables 2 and 3 and FIGS. 3 and 4.

TABLE 2

Optimal concentrations of ASAC, hexamethylenetriamine, phenyl acetate, glacial acetic acid and sodium bicarbonate at various fluid temperatures.

| Fluid Temperature (° C.) | ASAC (MW = 500K) (wt %) | Hexamethylenetriamine (wt %) | Phenyl Acetate (wt %) | Glacial Acetic Acid (wt %) | Sodium Bicarbonate (wt %) |
|---|---|---|---|---|---|
| 52-60 | 4 | 0.2-0.3 | 0.2-0.6 | 0.2-0.5 | 0 |
| 60-93 | 5 | 0.2-0.4 | 0.2-0.8 | 0.1-0.4 | 0-1 |
| 93-107 | 5 | 0.2-0.4 | 0.2-0.8 | 0-0.4 | 0-1 |
| 107-121 | 6 | 0.3-0.5 | 0.3-1.0 | 0 | 2 |
| >121 | 7 | 0.3-0.5 | 0.3-1.0 | 0 | 2 |

TABLE 3

Optimal concentrations of ASAC, hexamethylenetriamine, phenyl acetate, and hydrochloric acid at fluid temperatures lower than 52° C.

| Fluid Temperature (° C.) | ASAC (MW = 500K) (wt %) | Hexamethylenetriamine (wt %) | Phenyl Acetate (wt %) | Hydrochloric Acid (wt %) |
|---|---|---|---|---|
| <52 | 4 | 0.2 | 0.2-0.4 | 0.1-0.5 |

Both of the above embodiments may also contain particulate additives. These additives may be added for a number of reasons: to adjust the fluid density to increase the strength of the crosslinked gel and as an extender to reduce fluid cost. The particulate additives envisioned in the invention include (but are not limited to) amorphous or crystalline silica, hematite, barite, ilmenite, manganese tetraoxide, calcium carbonate, bentonite, attapulgite, smectite, montmorillonite, kaolinite, illite, chlorite, zeolites, diatomaceous earth, perlite, coal and gilsonite.

The second aspect is a method for controlling pressure buildup within an annular volume between two tubular bodies in a subterranean wellbore. The method comprises the following steps: (1) preparing a volume of a composition described by the first aspect of the invention, the volume being sufficient to fill at least a portion of the annular volume; (2) transporting the composition to, and filling at least a portion of, the annular volume; (3) sealing the annular volume; (4) allowing the polymer of the composition to crosslink and form a gel; (5) heating the annular volume, thereby increasing the pressure inside the annular volume; and (6) allowing the composition described by the first aspect of the invention to compress and compensate for the pressure increase inside the annular volume.

During Step 1, the base fluid of the composition may be prepared in a typical batch mixer or a cementing skid. The preferred acrylamide-base polymer in the composition is ASAC. The polymer molecular weight is preferably between about 300,000 to 10,000,000, and most preferably between about 300,000 to 1,000,000. The preferred concentration range is preferably between about 1% to 8% by weight, and most preferably between about 4% and 7% by weight. It will be appreciated that other acrylamide-base polymers may be used, including (but not limited to) polymethacrylamides, polyacrylamides, acrylic acid-acrylamide copolymers, acrylic acid-methacrylamide copolymers, partially hydrolyzed polymethacylamides and partially hydrolyzed polyacrylamides.

One embodiment of a composition suitable for the method comprises ASAC, a chromium (III) crosslinker, a gas and water. The crosslinker is preferably a water soluble chromium (III) compound, most preferably chromium (III) acetate. The chromium (III) acetate concentration may vary from about 0.2% to about 1.2% by weight, preferably between about 0.3% to about 1.2% by weight. The pumping time may be adjusted by adding a delay agent comprising one or more carboxylate species including (but not limited to) formate, acetate, proprionate, lactate, lower substituated derivatives thereof, and mixtures thereof. The preferred delay agent is sodium lactate, preferably added at concentrations ranging from about 0.2% to about 2.6% by weight.

Another embodiment of a composition suitable for the method comprises ASAC, a gas, water and a crosslinker comprising amine and phenyl compounds. The preferred amine compound is hexamethylenetriamine, preferably present at concentrations ranging from about 0.2% to 0.5% by weight. The preferred phenyl compound is phenyl acetate, preferably present at concentrations ranging from about 0.2% to 1.0% by weight. The fluid may further comprise an activator to control the working time, and may also comprise a high-temperature stabilizer. At fluid temperatures lower than about 52° C., the preferred activator is hydrochloric acid, preferably present in an amount up to about 0.5% by weight. At fluid temperatures higher than about 52° C., the preferred activator is acetic acid, preferably present at a concentration up to about 0.4% by weight. A stabilizer, preferably sodium bicarbonate, may be necessary at fluid temperatures above about 60° C.

At this time, particulate additives may also be included in the composition. The particulate additives may include (but not be limited to) amorphous or crystalline silica, hematite, barite, ilmenite, manganese tetraoxide, calcium carbonate, bentonite, attapulgite, smectite, montmorillonite, kaolinite, illite, chlorite, zeolites, diatomaceous earth, perlite, coal and gilsonite.

Using typical field equipment for preparing foamed cement slurries, a gas is mixed with the base fluid of the composition to achieve the desired quality. The preferred quality is between about 5% and 50%. A thorough description of foamed-cement design and preparation may be found in the following publication: Roziéres, J. and Griffin, T. J.: "Foamed Cement," in Nelson E. B. (ed.) *Well Cementing*, Elsevier, Amsterdam (1990) 14-1-14-19.

During Step 2, the energized acrylamide-base fluid is transported into the wellbore such that it fills at least a portion of the annular volume. This may be accomplished by pumping the fluid into the annulus during a primary-cementing operation. The primary cementing operation may be performed by pumping the fluid down the tubular and up the annulus, or by pumping the fluid directly into the annulus from the top of the string. Transportation of the energized acrylamide-base fluid may also be accomplished by pumping the fluid during a remedial-cementing operation. One example may be to perforate through one of the two casing strings, and pump the fluid directly into the annular region.

It will be understood by those skilled in the art that, as shown in FIG. 1, the annular region 4 may not be completely filled by the composition of the invention. Other fluids such as drilling fluid, spacer fluid, chemical wash and completion fluid may share this region.

During Step 3, the annular volume is sealed. This may comprise closing valves, allowing a hydraulic cement slurry to set and strengthen below the annular region 4, or both.

During Step 4, the polymer in the composition of the invention is allowed to crosslink, thereby forming a gel that encapsulates the gas of the composition. This process results in the formation of a compressible body within the annular region 4.

During Step 5, the production of formation fluids commences. The temperature of the formation fluids may be higher than that of the fluids inside the annular region 4. In such cases, the fluids in the annular region are heated. The resulting fluid expansion increases the pressure in the annular region.

During Step 6, the composition of the invention compresses in response to the pressure increase described in Step 5. This compression compensates for the pressure increase, relieving pressure that would otherwise be exerted against the tubular bodies.

EXAMPLES

Figure 5:
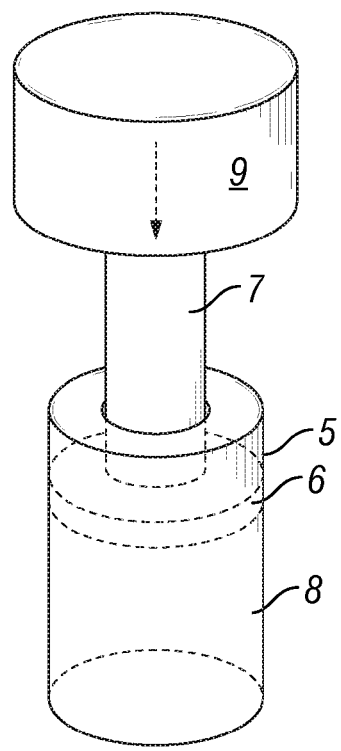
FIG. 5 is a diagram of the compression-cell device employed during experiments described in Examples 1 and 2.

The following examples serve to further illustrate the invention. Each example makes use of a device shown in FIG. 5. The device comprises a hollow cylindrical cell 5, a piston 6 and a loading rod 7. A test fluid 8 is placed inside the cell. A force 9 is exerted by the loading rod, causing the piston to compress the test fluid. The operator measures the displacement of the piston relative to force applied by the loading rod. Such measurements provide information about how the test fluid responds to an applied pressure.

This device was constructed by the inventors. The hollow cylindrical cell is a standard Baroid-type fluid-loss cell. One end the cell is sealed. The other end is sealed by a piston that travels through the cell interior. The outer edge of the piston is fitted with a rubber O-ring to maintain a hydraulic seal.

The internal diameter of the cell is 5.9 cm (2.2 in), and the height between the piston and the bottom of the cell is 8.1 cm (3.2 in). A bar is fixed to the outer side of piston to act as the loading rod. The apparatus is placed in a hydraulic press. The moving platen of the hydraulic press applies force on the loading rod, which in turn forces the piston into the cell interior.

During an experiment, sufficient test fluid is placed in the cell to completely fill the space between the bottom of the cell and the piston [200 cm$^3$ (12.16 in$^3$)]. The piston is inserted into the cell, the loading bar is attached, and the assembly is placed between the two platens in a hydraulic press. The press applies force at a loading rate of 25.6 MPa/min (4000 lbf/min). While the moving plate of the hydraulic press applies force on the loading rod, two measurements are taken continuously: (1) the force required to move the piston into the cell; and (2) the displacement of the piston into the cell. These data allow calculation of the test-fluid volume reduction and the pressure inside the cell.

Example 1

A fluid was prepared with the following composition.

| Material | Mass | Quantity |
| --- | --- | --- |
| Deionized Water | 661 g | 661 mL |
| ALCOFLOOD 254S | 39.8 g | 39.8 g |
| Chromium (III) Acetate (50 wt % solution) | 8.43 g | 6.48 mL |
| Sodium Lactate (60 wt % solution) | 6.31 g | 4.74 mL |
| Surfactant 1 | 12.0 g | 11.9 mL |
| Surfactant 2 | 12.7 g | 11.9 mL |
| Barite | 1176 g | 1176 g |

ALCOFLOOD 254S is acrylamide sodium-acrylate polymer, available from Ciba Specialty Chemicals. The molecular weight was about 500,000, and the degree of hydrolysis was about 5%. Surfactant 1 was a blend of the following components: 85% ammonium fatty alcohol ether sulfate and 15% ethylene glycol monobutyl ether. Surfactant 2 was an aqueous mixture of polyglycols, oxyalkylates and methanol (CAS Number R597-1).

The base fluid was prepared as follows. The water, ALCOFLOOD 254S, chromium (III) acetate solution and sodium lactate solution were mixed and blended in a paddle mixer for 30 minutes. Next, the barite was added, and the mixture was stirred 30 additional minutes in the paddle mixer. The density of the base fluid was 1920 kg/m$^3$ (16.0 lbm/gal).

The mixture was transferred to a closed-cup foam blender, and Surfactants 1 and 2 were added. Sufficient open volume was left in the blender to achieve a foam quality of 27%. The cup was sealed, and the mixture was sheared at 12,000 RPM to create a stable foam.

The foam was then transferred to the test cell, and allowed to cure for 24 hours in a 38° C. (100° F.) water bath. The acrylamide-base polymer crosslinked during the curing period, creating a foamed gel.

Figure 6:
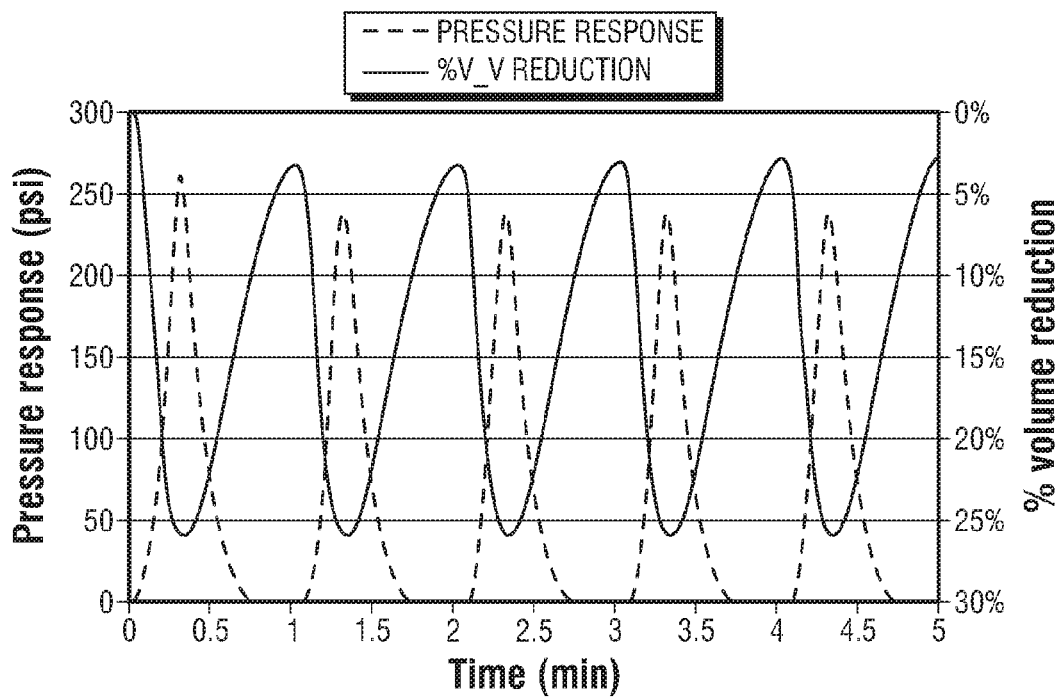
FIG. 6 is a plot associated with Example 1, showing the volume response of a foamed crosslinked acrylamide-base polymer gel to repeated pressurizations and depressurizations.

The piston and loading rod were fitted into the test cell, and the assembly was installed in a hydraulic press. Force was applied that was sufficient to reduce the volume inside the test cell by 33%. As a result, the pressure inside the cell increased to 1.8 MPa (260 psi). Thirty cycles were performed, and the results were essentially the same. FIG. 6 shows five of the cycles. This demonstrates the resiliency of the foamed gel, and illustrates its ability to mitigate several APB events without substantial degradation.

Example 2

A foamed gel as described in Example 1 was prepared. Two additional fluid systems were prepared for comparative purposes. Both were made from the same base fluid—a 1680-kg/m$^3$ (14.0-lbm/gal) MUDPUSH™ II spacer, available from Schlumberger. The fluid composition is shown below.

| Material | Mass | Quantity |
| --- | --- | --- |
| Deionized Water | 637 g | 637 mL |
| MUDPUSH II Spacer Mix | 9.9 g | 9.9 g |
| Barite | 779 g | 779 g |

A first MUDPUSH II spacer was foamed to a quality of 27%, using a surfactant system described below.

| Material | Mass | Quantity |
| --- | --- | --- |
| Surfactant 1 | 10.7 g | 10.6 mL |
| Surfactant 2 | 11.3 g | 10.6 mL |
| Surfactant 3 | 44.4 g | 42.3 mL |

Surfactants 1 and 2 are described in Example 1. Surfactant 3 was a blend of 80% di-secondary butyl phenol with 10 moles EO, 15% water and 5% methanol.

A second MUDPUSH II spacer contained 30% hollow glass microspheres by volume of solids, with a crush strength of 34.5 MPa (5000 psi). The glass microspheres were available from 3M.

Figure 7:
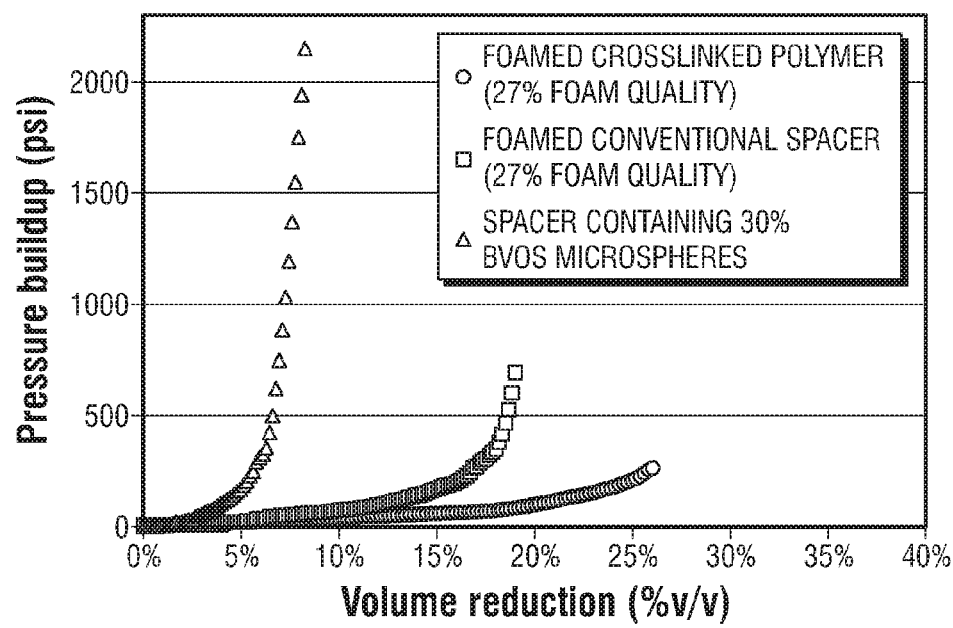
FIG. 7 is a plot associated with Example 2, comparing the compressibility of a foamed crosslinked acrylamide-base polymer gel to a foamed spacer fluid and a spacer fluid containing hollow glass microspheres.

Each of the three fluids was tested in the compression cell described above. The pressure buildup in the cell was monitored as the fluid was compressed by the piston. The results are shown in FIG. 7. The spacer fluid containing hollow glass microspheres was able to withstand about 5 vol % compression before pressure buildup commenced. The microspheres collapsed, and the fluid could no longer compensate for further volume reduction. The foamed spacer behaved as a compressible fluid up about 15% volume reduction, after which the pressure increased rapidly. Finally, the foamed acrylamide-base gel was able to compensate for about 25% volume reduction, owing to the encapsulated gas and the compressibility of the crosslinked gel.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

The invention claimed is:

1. A method of controlling pressure buildup within an annular volume between two tubular bodies in a subterranean wellbore, comprising:
   (i) preparing a composition that is sufficient to fill at least a portion of the annular volume, the composition comprising at least one water-soluble acrylamide polymer, a crosslinker, a gas and water.
   (ii) placing the composition into, and filling at least a portion of, the annular volume;
   (iii) sealing the annular volume;
   (iv) allowing the polymer of the composition to crosslink and form a gel that encapsulates the gas of the composition, thereby providing a compressible body within the annular volume.

2. The method of claim 1, wherein the composition is transported to the annular volume during a primary-cementing operation.

3. The method of claim 2, wherein the composition is transported to the annular volume by being pumped all the way down a tubular and then coming up the annulus.

4. The method of claim 2, wherein the composition is transported to the annular volume by being placed directly in the annulus.

5. The method of claim 1, wherein the composition is transported to the annular volume during a remedial-cementing operation.

6. The method of claim 1, wherein the polymer of the composition comprises one or more members selected from the group consisting of polymethacrylamides, polyacrylamides, acrylic acid-acrylamide copolymers, acrylic acid-methacrylamide copolymers, acrylamide-sodium acrylate copolymers, partially hydrolyzed polymethacylamides and partially hydrolyzed polyacrylamides.

7. The method of claim 1, wherein the polymer of the composition is acrylamide-sodium acrylate copolymer.

8. The method of claim 7, wherein the polymer molecular weight is in the range from about 300,000 to 10,000,000.

9. The method of claim 1, wherein the polymer is present in the range between about 4% to about 7% by weight.

10. The method of claim 1, wherein the gas of the composition comprises one or more members selected from the group consisting of nitrogen, air and carbon dioxide.

11. The method of claim 1, wherein the gas is present at a concentration between about 5% to 50% by volume.

12. The method of claim 1, further comprising the addition of one or more particulate additives selected from the group consisting of amorphous or crystalline silica, hematite, barite, ilmenite, manganese tetraoxide, calcium carbonate, bentonite, attapulgite, smectite, montmorillonite, kaolinite, illite, chlorite, zeolithes, diatomaceous earth, perlite, coal and gilsonite.

13. The method of claim 1, wherein the crosslinker of the composition comprises at least one water soluble chromium (III) compound.

14. The method of claim 13, wherein the chromium (III) compound is chromium (III) acetate.

15. The method of claim 14, wherein the chromium (III) acetate is present in an amount between about 0.3% to about 1.2% by weight.

16. The method of claim 13, wherein the composition further comprises one or more carboxylate species, the carboxylate species selected from the group consisting of formate, acetate, proprionate, lactate, lower substituted derivatives thereof, and mixtures thereof.

17. The method of claim 16, wherein the carboxylate species is sodium lactate.

18. The method of claim 17, wherein the sodium lactate is present in the range between about 0.25% to about 2.5% by volume.

19. The method of claim 1, wherein the crosslinker of the composition is one or more members of the list consisting of: amine compounds and phenyl compounds.

20. The method of claim 19, wherein the amine compound is hexamethylenetriamine.

21. The method of claim 20, wherein the hexamethylenetriamine is present in an amount between about 0.2% to about 0.5% by weight.

22. The method of claim 19, wherein the phenyl compound is phenyl acetate.

23. The method of claim 22, wherein the phenyl acetate is present in an amount between about 0.2% to about 1.0% by weight.

24. The method of claim 19, wherein the composition further comprises one or more members of the list consisting of: acetic acid, hydrochloric acid and sodium bicarbonate.

25. A method comprising:
(i) preparing a composition that is sufficient to fill at least a portion of an annular volume between two bodies in a subterranean wellbore, the composition comprising at least one water-soluble acrylamide polymer, a crosslinker, a gas and water;
(ii) placing the composition into, and filling at least a portion of, the annular volume,
(iii) sealing the annular volume; and
(iv) allowing the polymer of the composition to crosslink and form a gel that encapsulates the gas of the composition, thereby providing a compressible body within the annular volume;
whereby pressure buildup within the annular volume between two tubular bodies in a subterranean wellbore is controlled.

* * * * *